United States Patent
Wu et al.

(10) Patent No.: US 10,701,401 B2
(45) Date of Patent: *Jun. 30, 2020

(54) SYNTAX STRUCTURES INDICATING COMPLETION OF CODED REGIONS

(71) Applicant: Microsoft Technology Licensing, LLC, Redmond, WA (US)

(72) Inventors: Yongjun Wu, Bellevue, WA (US); Lihua Zhu, Mountain View, CA (US); Shyam Sadhwani, Bellevue, WA (US); Gary J. Sullivan, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/240,017

(22) Filed: Jan. 4, 2019

(65) Prior Publication Data

US 2019/0158881 A1    May 23, 2019

Related U.S. Application Data

(63) Continuation of application No. 15/713,414, filed on Sep. 22, 2017, now Pat. No. 10,205,966, which is a (Continued)

(51) Int. Cl.
*H04N 19/70* (2014.01)
*H04N 19/167* (2014.01)
(Continued)

(52) U.S. Cl.
CPC .......... *H04N 19/70* (2014.11); *H04N 19/119* (2014.11); *H04N 19/167* (2014.11);
(Continued)

(58) Field of Classification Search
None
See application file for complete search history.

(56) References Cited

U.S. PATENT DOCUMENTS 9,800,898 B2 * 10/2017 Wu .................. H04N 19/70
10,205,966 B2 * 2/2019 Wu .................. H04N 19/70
(Continued)

FOREIGN PATENT DOCUMENTS

CN    101243459    8/2008
CN    101548548    9/2009
CN    103621092    3/2014

OTHER PUBLICATIONS

Office Action dated Jul. 3, 2019, from Chinese Patent Application No. 201580054170.0, 6 pp.
(Continued)

*Primary Examiner* — Christopher G Findley
(74) *Attorney, Agent, or Firm* — Klarquist Sparkman, LLP

(57) ABSTRACT

Syntax structures that indicate the completion of coded regions of pictures are described. For example, a syntax structure in an elementary bitstream indicates the completion of a coded region of a picture. The syntax structure can be a type of network abstraction layer unit, a type of supplemental enhancement information message or another syntax structure. For example, a media processing tool such as an encoder can detect completion of a coded region of a picture, then output, in a predefined order in an elementary bitstream, syntax structure(s) that contain the coded region as well as a different syntax structure that indicates the completion of the coded region. Another media processing tool such as a decoder can receive, in a predefined order in an elementary bitstream, syntax structure(s) that contain a coded region of a picture as well as a different syntax structure that indicates the completion of the coded region.

20 Claims, 5 Drawing Sheets

Related U.S. Application Data continuation of application No. 14/705,705, filed on May 6, 2015, now Pat. No. 9,800,898.

(60) Provisional application No. 62/060,458, filed on Oct. 6, 2014.

(51) Int. Cl.
*H04N 19/172* (2014.01)
*H04N 19/169* (2014.01)
*H04N 19/119* (2014.01)
*H04N 19/44* (2014.01)
*H04N 19/89* (2014.01)

(52) U.S. Cl.
CPC ......... *H04N 19/172* (2014.11); *H04N 19/188* (2014.11); *H04N 19/44* (2014.11); *H04N 19/89* (2014.11)

(56) References Cited

U.S. PATENT DOCUMENTS

| | | | | |
|---|---|---|---|---|
| 2012/0163452 | A1* | 6/2012 | Horowitz | H04N 19/137 375/240.12 |
| 2014/0092994 | A1* | 4/2014 | Wang | H04N 19/70 375/240.26 |

OTHER PUBLICATIONS

Second Office Action dated Jan. 9, 2020, from Chinese Patent Application No. 201580054170.0, 9 pp.

\* cited by examiner software 180 implementing one or more innovations for syntax structures indicating completion of coded regions

Figure 6
600
| end_of_pic_rbsp() { | Descriptor |
|---|---|
| } | |
Figure 7
700
| coded_region_completion( payloadSize ) { | Descriptor |
|---|---|
|    next_segment_address | ue(v) |
| } | |
Figure 8
800
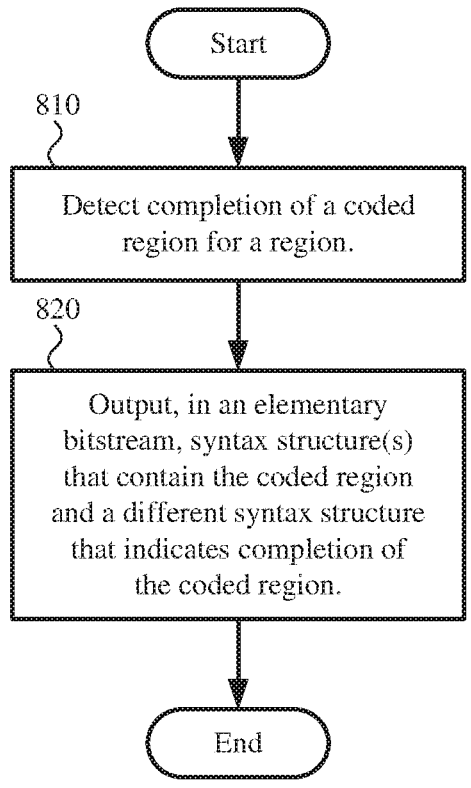
Figure 9
900
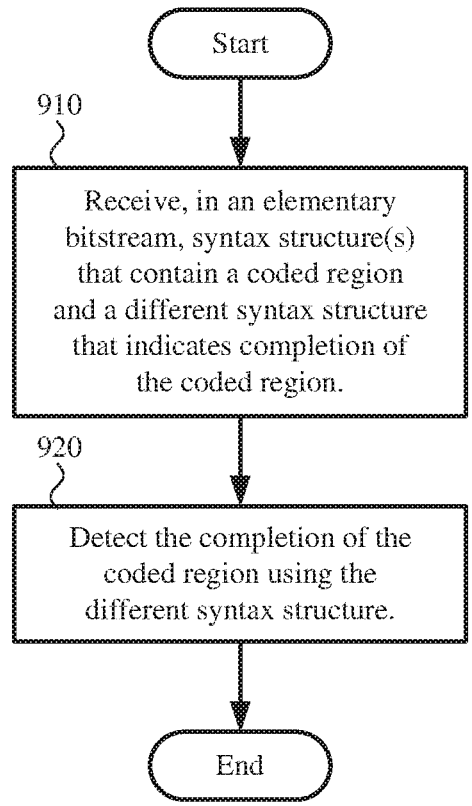

SYNTAX STRUCTURES INDICATING COMPLETION OF CODED REGIONS

CROSS REFERENCE TO RELATED APPLICATION

This application is a continuation of U.S. patent application Ser. No. 15/713,414, filed Sep. 22, 2017, which is a continuation of U.S. patent application Ser. No. 14/705,705, filed May 6, 2015, now U.S. Pat. No. 9,800,898, the disclosure of which is hereby incorporated by reference. U.S. patent application Ser. No. 14/705,705 claims the benefit of U.S. Provisional Patent Application No. 62/060,458, filed Oct. 6, 2014, the disclosure of which is hereby incorporated by reference.

BACKGROUND

Engineers use compression (also called source coding or source encoding) to reduce the bit rate of digital video. Compression decreases the cost of storing and transmitting video information by converting the information into a lower bit rate form. Decompression (also called decoding) reconstructs a version of the original information from the compressed form. A "codec" is an encoder/decoder system.

Over the last 25 years, various video codec standards have been adopted, including the ITU-T H.261, H.262 (MPEG-2 or ISO/IEC 13818-2), H.263, and H.264 (MPEG-4 AVC or ISO/IEC 14496-10) standards, the MPEG-1 (ISO/IEC 11172-2) and MPEG-4 Visual (ISO/IEC 14496-2) standards, and the SMPTE 421M (VC-1) standard. More recently, the H.265/HEVC standard (ITU-T H.265 or ISO/IEC 23008-2) has been approved. A video codec standard typically defines options for the syntax of an encoded video bitstream, detailing parameters in the bitstream when particular features are used in encoding and decoding. For example, recent video codec standards (e.g., H.264/AVC, H.265/HEVC) define various syntax structures, where a syntax structure is a set of zero or more syntax elements (elements of data) in the bitstream in a specified order. In many cases, a video codec standard also provides details about the decoding operations a decoder should perform to achieve conforming results in decoding. Aside from codec standards, various proprietary codec formats define other options for the syntax of an encoded video bitstream and corresponding decoding operations.

In recent video codec standards (e.g., H.264/AVC, H.265/HEVC), a picture is organized as one or more slices, where a slice is set of blocks (e.g., macroblocks in the H.264/AVC standard; coding tree units in the H.265/HEVC standard). The encoded data for a slice is organized in a specific syntax structure, which is contained in a network abstraction layer ("NAL") unit. A NAL unit is a syntax structure that contains (1) an indication of the type of data to follow and (2) a series of zero or more bytes of the data (e.g., the encoded data for a slice). The size of the NAL unit (in bytes) may be indicated outside the NAL unit or may be measured by identifying the boundaries between NAL units in a byte stream format (e.g., in some cases, a decoder can measure the sizes of NAL units when the decoder searches for start codes that begin the NAL units, and in other cases the size of a NAL unit might be indicated by "out-of-band" information such as data carried in a data field according to a multimedia system multiplexing protocol, packet network protocol, or file format). An access unit is a set of one or more NAL units containing the encoded data for the slice(s) of a picture (and possibly other associated data such as metadata).

For decoding according to the H.264/AVC standard or H.265/HEVC standard, a decoder may be designed to start the decoding process for a given picture after the decoder has received a coded slice for the given picture, in which case the decoder can start to decode the coded slice. In many implementations, however, a decoder is designed to start the decoding process for a given picture after the decoder has received all of the encoded data for the given picture. To determine that it has received all of the encoded data for the given picture, the decoder can wait until it receives encoded data for the next picture (in the next access unit), which includes one or more syntax elements that indicate the start of encoded data for the next picture. Or, to determine that it has received all of the encoded data for the given picture, the decoder can fully parse the encoded data for the given picture. Either approach can introduce delay or extra complexity in the decoding process, which is not desired, especially in real-time video communication scenarios in which having very low latency is critical (such as video conferencing, wireless "screen casting" from a computing device to a nearby display, remote video gaming, etc.).

In another approach, within a media playback tool or particular system environment, one component within the media playback tool (or particular system environment) can create a custom syntax structure that is used to signal the end of encoded data for a given picture, then provide that syntax structure to a decoder within the media playback tool (or particular system environment). This custom syntax structure is provided outside the elementary bitstream that includes encoded video data, e.g., in system-level information such as system multiplexing data. Thus, this approach does not carry the custom syntax structure within the elementary bitstream of a video codec standard or format. It lacks general applicability, and it excludes an encoder or other component outside the specific media playback tool (or particular system environment) from involvement.

SUMMARY

In summary, the detailed description presents innovations in syntax structures that indicate the completion of coded regions. For example, a syntax structure in a codec format-conformant elementary bitstream indicates the completion of a coded region. The innovations can reduce overall latency during decoding by allowing a decoding process to start more quickly. In some cases, the innovations can also reduce the complexity of the decoding process by reducing the amount of data that needs to be buffered before decoding, or by eliminating the need to fully parse incoming data as it arrives. The innovations can also facilitate error detection and improve robustness to loss of packets of encoded data.

According to one aspect of the innovations described herein, a media processing tool such as an encoder, multiplexer or bitstream editor detects completion of a coded region for a region of an image or video. The media processing tool outputs, in an elementary bitstream, (0.1) one or more syntax structures that contain the coded region, and (2) after the syntax structure(s) that contain the coded region, a different syntax structure that indicates the completion of the coded region.

According to another aspect of the innovations described herein, a media processing tool such as a decoder, demultiplexer or bitstream editor receives, in an elementary bitstream. (1) one or more syntax structures that contain a coded region for a region of an image or video, and (2) after the syntax structure(s) that contain the coded region, a different syntax structure that indicates completion of the coded region. The media processing tool detects the completion of the coded region using the different syntax structure.

In some example implementations, the elementary bitstream is conformant to a codec format. Also, the syntax structure(s) that contain the coded region and the different syntax structure that indicates the completion of a coded region are typically in a predefined order (e.g., a specific order of network abstraction layer units for an access unit), which facilitates detection of the completion of the coded region using the different syntax structure.

The innovations can be implemented as part of a method, as part of a computing system configured to perform the method or as part of a tangible computer-readable media storing computer-executable instructions for causing a processor, when programmed thereby, to perform the method. The various innovations can be used in combination or separately. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the invention will become more apparent from the following detailed description, which proceeds with reference to the accompanying figures.

BRIEF DESCRIPTION OF THE DRAWINGS

FIG. 6 is a diagram illustrating part of an example network abstraction layer unit indicating completion of a coded region.

FIG. 7 is a diagram illustrating an example supplemental enhancement information message indicating completion of a coded region.

FIGS. 8 and 9 are flowcharts illustrating generalized techniques for inserting and using, respectively, a syntax structure that indicates completion of a coded region.

DETAILED DESCRIPTION

The detailed description presents innovations in syntax structures that indicate the completion of coded regions. For example, a syntax structure in an elementary bitstream indicates the completion of a coded region, where the region can be a slice, tile, picture or other region within a picture. The syntax structure that indicates the completion of a coded region can be a special type of network abstraction layer ("NAL") unit, a special type of supplemental enhancement information ("SEI") message or another syntax structure. The innovations can reduce latency during decoding by allowing a decoder to more quickly detect a coded picture boundary and start the decoding process for a given picture.

In some cases, the innovations can also simplify the decoding process by reducing the amount of data that needs to be buffered before decoding, or by eliminating the need to fully parse incoming data as it arrives. The innovations can also facilitate error detection and improve robustness to loss of packets of encoded data (e.g., for a slice or tile).

Operations described herein are in places described as being performed by a video encoder or video decoder. In many cases, the operations can be performed by another type of media processing tool (e.g., image encoder or image decoder, multiplexer, demultiplexer, a bitstream editor). Examples of encoders, decoders, multiplexers and demultiplexers are provided below. A bitstream editor can be any tool that edits syntax structures of an elementary bitstream (e.g., to insert, modify, or remove syntax structures).

Some of the innovations described herein are illustrated with reference to terms specific to the H.264/AVC standard or H.265/HEVC standard. For example, reference is made to the April 2013 version of the H.265/HEVC standard (ITU-T H.265, "High Efficiency Video Coding") and the March 2010 version of the H.264/AVC standard (ITU-T H.264. "Advanced Video Coding for Generic Audiovisual Services"). The innovations described herein can also be implemented for other standards or formats.

More generally, various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Different embodiments use one or more of the described innovations. Some of the innovations described herein address one or more of the problems noted in the background. Typically, a given technique/tool does not solve all such problems.

I. Example Computing Systems.

Figure 1:
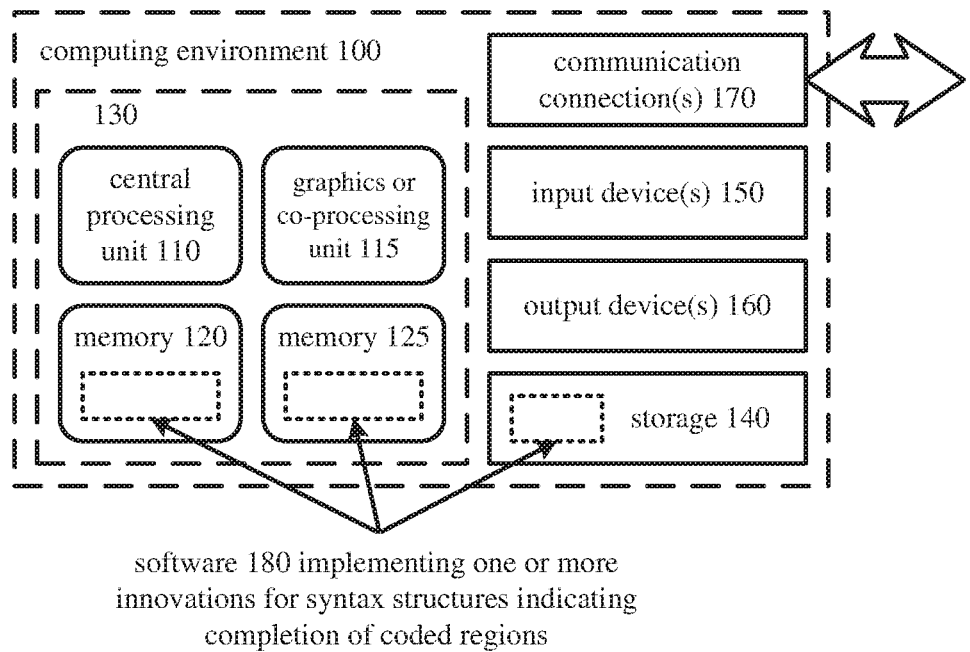
FIG. 1 is a diagram of an example computing system in which some described embodiments can be implemented.

FIG. 1 illustrates a generalized example of a suitable computing system (100) in which several of the described innovations may be implemented. The computing system (100) is not intended to suggest any limitation as to scope of use or functionality, as the innovations may be implemented in diverse general-purpose or special-purpose computing systems.

With reference to FIG. 1, the computing system (100) includes one or more processing units (110, 115) and memory (120, 125). The processing units (110, 115) execute computer-executable instructions. A processing unit can be a general-purpose central processing unit ("CPU"), processor in an application-specific integrated circuit ("ASIC") or any other type of processor. In a multi-processing system, multiple processing units execute computer-executable instructions to increase processing power. For example, FIG. 1 shows a central processing unit (110) as well as a graphics processing unit or co-processing unit (115). The tangible memory (120, 125) may be volatile memory (e.g., registers, cache, RAM), non-volatile memory (e.g., ROM, EEPROM, flash memory, etc.), or some combination of the two, accessible by the processing unit(s). The memory (120, 125) stores software (180) implementing one or more innovations for syntax structures that indicate completion of coded regions, in the form of computer-executable instructions suitable for execution by the processing unit(s).

A computing system may have additional features. For example, the computing system (100) includes storage (140), one or more input devices (150), one or more output devices (160), and one or more communication connections (170). An interconnection mechanism (not shown) such as a bus, controller, or network interconnects the components of the computing system (100). Typically, operating system software (not shown) provides an operating environment for other software executing in the computing system (100), and coordinates activities of the components of the computing system (100).

The tangible storage (140) may be removable or non-removable, and includes devices such as magnetic disks, magnetic tapes or cassettes, CD-ROMs. DVDs. or any other medium which can be used to store information and which can be accessed within the computing system (100). The storage (140) stores instructions for the software (180) implementing one or more innovations for syntax structures that indicate completion of coded regions.

The input device(s) (150) may be a touch input device such as a keyboard, mouse, pen, or trackball, a voice input device, a scanning device, or another device that provides input to the computing system (100). For video, the input device(s) (150) may be a camera, video card, TV tuner card, screen capture module, or similar device that accepts video input in analog or digital form, or a CD-ROM or CD-RW that reads video input into the computing system (100). The output device(s) (160) may be a display, printer, speaker. CD-writer, or another device that provides output from the computing system (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical. RF, or other carrier.

The innovations can be described in the general context of computer-readable media. Computer-readable media are any available tangible media that can be accessed within a computing environment. By way of example, and not limitation, with the computing system (100), computer-readable media include memory (120, 125), storage (140), and combinations of any of the above. The term "computer-readable media" does not cover, encompass, or otherwise include carrier waves, signals per se or transitory propagating signals.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

The disclosed methods can also be implemented using specialized computing hardware configured to perform any of the disclosed methods. For example, the disclosed methods can be implemented by an integrated circuit (e.g., an ASIC such as an ASIC digital signal processor ("DSP"), a graphics processing unit ("GPU"), or a programmable logic device ("PLD") such as a field programmable gate array ("FPGA")) specially designed or configured to implement any of the disclosed methods.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

II. Example Network Environments.

Figure 2A:
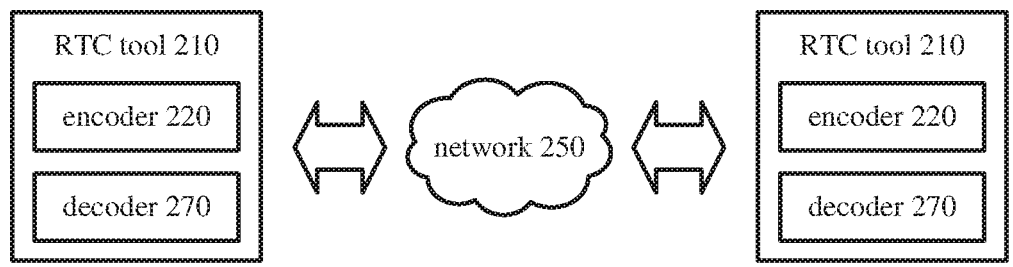
FIGS. 2a and 2b are diagrams of example network environments in which some described embodiments can be implemented.
Figure 2B:

FIGS. 2*a* and 2*b* show example network environments (201, 202) that include video encoders (220) and video decoders (270). The encoders (220) and decoders (270) are connected over a network (250) using an appropriate communication protocol. The network (250) can include the Internet or another computer network.

In the network environment (201) shown in FIG. 2*a*, each real-time communication ("RTC") tool (210) includes both an encoder (220) and a decoder (270) for bidirectional communication. A given encoder (220) can produce output compliant with a variation or extension of the H.265/HEVC standard, SMPTE 421M standard. ISO/IEC 14496-10 standard (also known as H.264 or AVC), another standard, or a proprietary format, with a corresponding decoder (270) accepting encoded data from the encoder (220). The bidirectional communication can be part of a video conference, video telephone call, or other two-party or multi-party communication scenario. Although the network environment (201) in FIG. 2*a* includes two real-time communication tools (210), the network environment (201) can instead include three or more real-time communication tools (210) that participate in multi-party communication.

Figure 3:
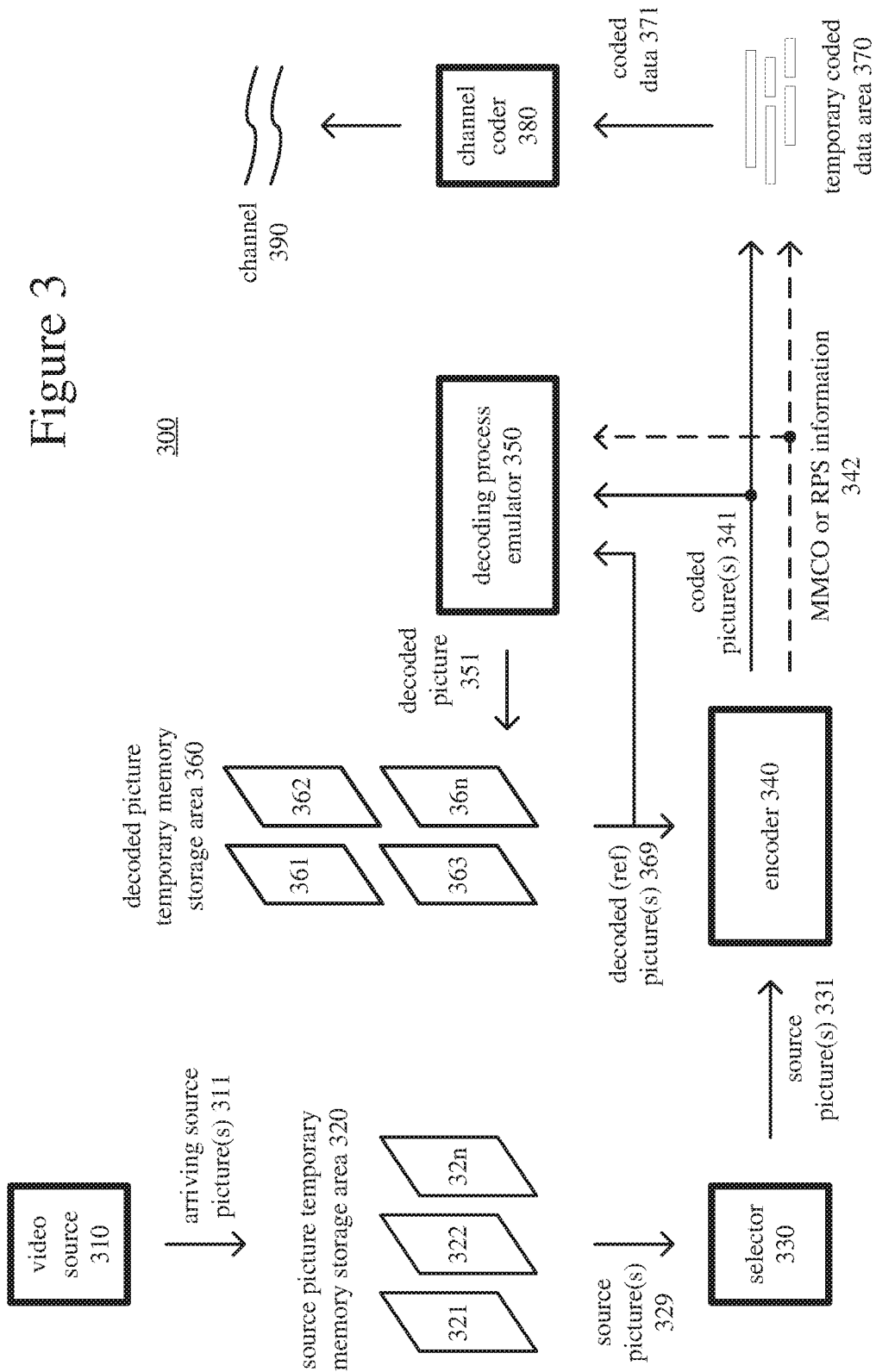
FIG. 3 is a diagram of an example encoder system in conjunction with which some described embodiments can be implemented.
Figure 4:
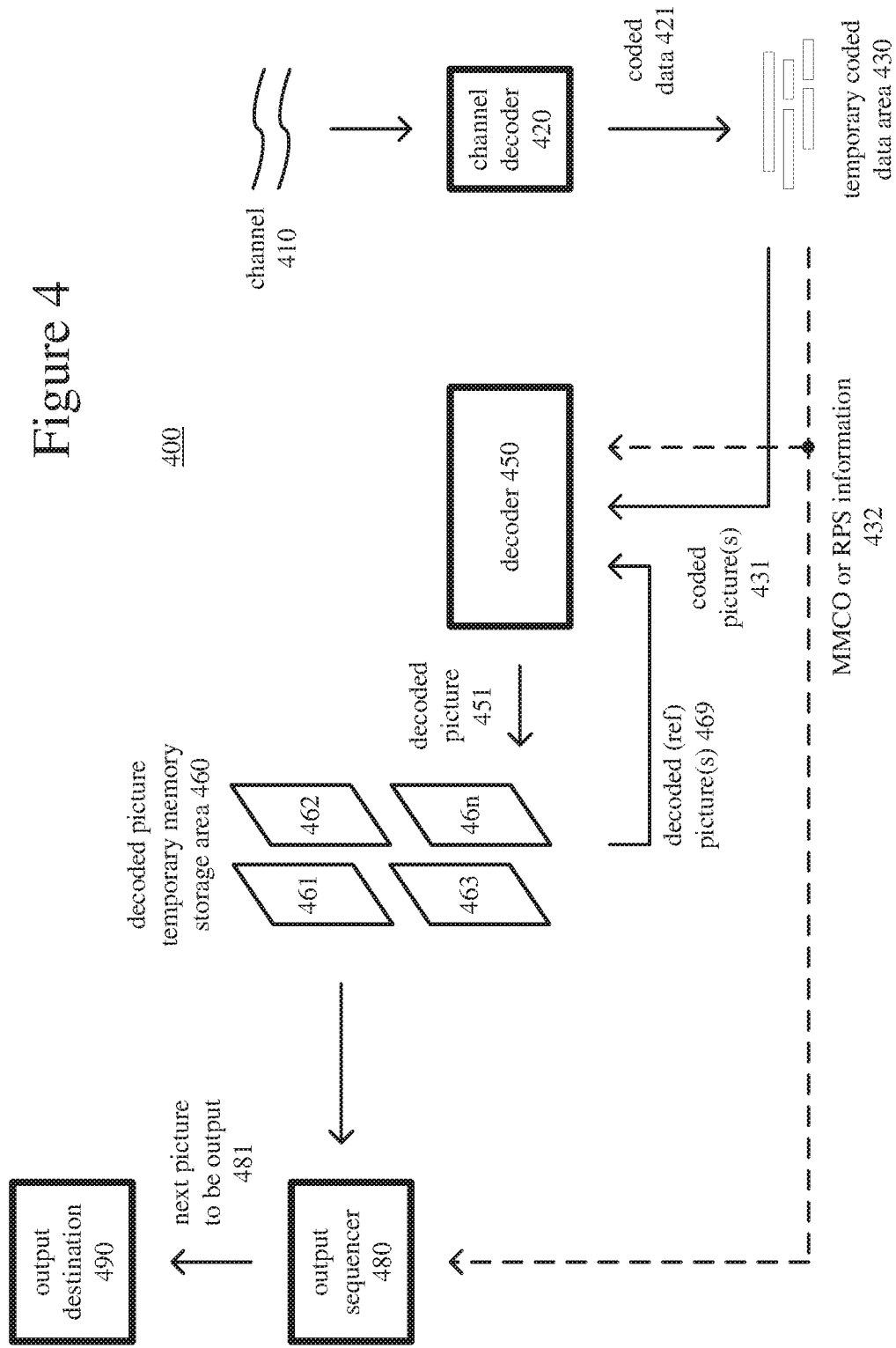
FIG. 4 is a diagram of an example decoder system in conjunction with which some described embodiments can be implemented.

A real-time communication tool (210) manages encoding by an encoder (220). FIG. 3 shows an example encoder system (300) that can be included in the real-time communication tool (210). Alternatively, the real-time communication tool (210) uses another encoder system. A real-time communication tool (210) also manages decoding by a decoder (270). FIG. 4 shows an example decoder system (400), which can be included in the real-time communication tool (210). Alternatively, the real-time communication tool (210) uses another decoder system.

In the network environment (202) shown in FIG. 2*b*, an encoding tool (212) includes an encoder (220) that encodes video for delivery to multiple playback tools (214), which include decoders (270). The unidirectional communication can be provided for a video surveillance system, web camera monitoring system, remote desktop conferencing presentation or other scenario in which video is encoded and sent from one location to one or more other locations. Although the network environment (202) in FIG. 2*b* includes two playback tools (214), the network environment (202) can include more or fewer playback tools (214). In general, a playback tool (214) communicates with the encoding tool (212) to determine a stream of video for the playback tool (214) to receive. The playback tool (214) receives the stream, buffers the received encoded data for an appropriate period, and begins decoding and playback.

FIG. 3 shows an example encoder system (300) that can be included in the encoding tool (212). Alternatively, the encoding tool (212) uses another encoder system. The encoding tool (212) can also include server-side controller logic for managing connections with one or more playback tools (214). FIG. 4 shows an example decoder system (400), which can be included in the playback tool (214). Alternatively, the playback tool (214) uses another decoder system. A playback tool (214) can also include client-side controller logic for managing connections with the encoding tool (212).

III. Example Encoder Systems.

FIG. 3 is a block diagram of an example encoder system (300) in conjunction with which some described embodiments may be implemented. The encoder system (300) can be a general-purpose encoding tool capable of operating in any of multiple encoding modes such as an ultra-low-latency or low-latency encoding mode for real-time communication, a transcoding mode, and a higher-latency encoding mode for producing media for playback from a file or stream, or it can be a special-purpose encoding tool adapted for one such encoding mode. The encoder system (300) can be adapted for encoding of a particular type of content (e.g., screen capture content). The encoder system (300) can be implemented as part of an operating system module, as part of an application library, as part of a standalone application or using special-purpose hardware. Overall, the encoder system (300) receives a sequence of source video pictures (311) from a video source (310) and produces encoded data as output to a channel (390). The encoded data output to the channel can include syntax structures that indicate completion of coded regions.

The video source (310) can be a camera, tuner card, storage media, screen capture module, or other digital video source. The video source (310) produces a sequence of video pictures at a frame rate of, for example, 30 frames per second. As used herein, the term "picture" generally refers to source, coded or reconstructed image data. For progressive-scan video, a picture is a progressive-scan video frame. For interlaced video, in example embodiments, an interlaced video frame might be de-interlaced prior to encoding. Alternatively, two complementary interlaced video fields are encoded together as a single video frame or encoded as two separately-encoded fields. Aside from indicating a progressive-scan video frame or interlaced-scan video frame, the term "picture" can indicate a single non-paired video field, a complementary pair of video fields, a video object plane that represents a video object at a given time, or a region of interest in a larger image. The video object plane or region can be part of a larger image that includes multiple objects or regions of a scene.

An arriving source picture (311) is stored in a source picture temporary memory storage area (320) that includes multiple picture buffer storage areas (321, 322, . . . , 32n). A picture buffer (321, 322, etc.) holds one source picture in the source picture storage area (320). After one or more of the source pictures (311) have been stored in picture buffers (321, 322, etc.), a picture selector (330) selects an individual source picture from the source picture storage area (320). The order in which pictures are selected by the picture selector (330) for input to the encoder (340) may differ from the order in which the pictures are produced by the video source (310), e.g., the encoding of some pictures may be delayed in order, so as to allow some later pictures to be encoded first and to thus facilitate temporally backward prediction. Before the encoder (340), the encoder system (300) can include a pre-processor (not shown) that performs pre-processing (e.g., filtering) of the selected picture (331) before encoding. The pre-processing can include color space conversion into primary (e.g., luma) and secondary (e.g., chroma differences toward red and toward blue) components and resampling processing (e.g., to reduce the spatial resolution of chroma components) for encoding. Before encoding, video may be converted to a color space such as YUV, in which sample values of a luma (Y) component represent brightness or intensity values, and sample values of chroma (U. V) components represent color-difference values. The precise definitions of the color-difference values (and conversion operations to/from YUV color space to another color space such as RGB) depend on implementation.

The encoder (340) encodes the selected picture (331) to produce a coded picture (341) and also produces memory management control operation ("MMCO") signals (342) or reference picture set ("RPS") information. The RPS is the set of pictures that may be used for reference in motion compensation for a current picture or any subsequent picture. If the current picture is not the first picture that has been encoded, when performing its encoding process, the encoder (340) may use one or more previously encoded/decoded pictures (369) that have been stored in a decoded picture temporary memory storage area (360). Such stored decoded pictures (369) are used as reference pictures for inter-picture prediction of the content of the current source picture (331). The MMCO/RPS information (342) indicates to a decoder which reconstructed pictures may be used as reference pictures, and hence should be stored in a picture storage area.

Generally, the encoder (340) includes multiple encoding modules that perform encoding tasks such as partitioning into tiles, intra-picture prediction estimation and prediction, motion estimation and compensation, frequency transforms, quantization and entropy coding. The exact operations performed by the encoder (340) can vary depending on compression format. The format of the output encoded data can be a variation or extension of Windows Media Video format. VC-1 format, MPEG-x format (e.g., MPEG-1, MPEG-2, or MPEG-4), H.26x format (e.g., H.261, H.262, H.263. H.264, H.265), or another format.

The encoder (340) can partition a picture into multiple tiles of the same size or different sizes. For example, the encoder (340) splits the picture along tile rows and tile columns that, with picture boundaries, define horizontal and vertical boundaries of tiles within the picture, where each tile is a rectangular region. Tiles are often used to provide options for parallel processing. A picture can also be organized as one or more slices, where a slice can be an entire picture or section of the picture. A slice can be decoded independently of other slices in a picture, which improves error resilience. The content of a slice or tile is further partitioned into blocks or other sets of sample values for purposes of encoding and decoding.

For syntax according to the H.264/AVC standard, the encoder (340) can partition a frame into multiple slices of the same size or different sizes. The encoder (340) splits the content of a frame (or slice) into 16×16 macroblocks. A macroblock includes luma sample values organized as four 8×8 luma blocks and corresponding chroma sample values organized as 8×8 chroma blocks. Generally, a macroblock has a prediction mode such as inter or intra. A macroblock includes one or more prediction units (e.g., 8×8 blocks, 4×4 blocks, which may be called partitions for inter-frame prediction) for purposes of signaling of prediction information (such as prediction mode details, motion vector ("MV") information, etc.) and/or prediction processing. A macroblock also has one or more residual data units for purposes of residual coding/decoding.

For syntax according to the H.265/HEVC standard, the encoder splits the content of a picture (or slice or tile) into coding tree units. A coding tree unit ("CTU") includes luma sample values organized as a luma coding tree block ("CTB") and corresponding chroma sample values organized as two chroma CTBs. The size of a CTU (and its CTBs) is selected by the encoder. A luma CTB can contain, for example, 64×64, 32×32 or 16×16 luma sample values. A CTU includes one or more coding units. A coding unit ("CU") has a luma coding block ("CB") and two corresponding chroma CBs. Generally, a CU has a prediction mode such as inter or intra. A CU includes one or more prediction units for purposes of signaling of prediction information (such as prediction mode details, displacement values, etc.) and/or prediction processing. A prediction unit ("PU") has a luma prediction block ("PB") and two chroma PBs. A CU also has one or more transform units for purposes of residual coding/decoding, where a transform unit ("TU") has a luma transform block ("TB") and two chroma TBs. A CU may have a single TU or multiple TUs. The encoder decides how to partition video into CTUs, CUs, PUs. TUs, etc.

In H.265/HEVC implementations, a slice can include a single slice segment (independent slice segment) or be divided into multiple slice segments (independent slice segment and one or more dependent slice segments). A slice segment is an integer number of CTUs ordered consecutively in a tile scan, contained in a single network abstraction layer ("NAL") unit. For an independent slice segment, a slice segment header includes values of syntax elements that apply for the independent slice segment. For a dependent slice segment, a truncated slice segment header includes a few values of syntax elements that apply for that dependent slice segment, and the values of the other syntax elements for the dependent slice segment are inferred from the values for the preceding independent slice segment in decoding order.

As used herein, the term "block" can indicate a macroblock, residual data unit, CTB, CB, PB or TB, or some other set of sample values, depending on context. The term "unit" can indicate a macroblock, CTU. CU, PU. TU or some other set of blocks, or it can indicate a single block, depending on context.

Returning to FIG. 3, the encoder represents an intra-coded block of a source picture (331) in terms of prediction from other, previously reconstructed sample values in the picture (331). For intra block copy ("IBC") prediction, an intra-picture estimator estimates displacement from a current block to a position in the other, previously reconstructed sample values. A reference block of sample values in the picture are used to generate prediction values for the current block. The reference block can be indicated with a block vector ("BV") value (determined in BV estimation). IBC prediction may be implemented as a special case of inter-picture prediction for which the reference picture is the current picture. For intra spatial prediction for a block, the intra-picture estimator estimates extrapolation of the neighboring reconstructed sample values into the block.

The intra-picture estimator can output prediction information (such as BV values for IBC prediction, or prediction mode (direction) for intra spatial prediction), which is entropy coded. An intra-picture prediction predictor applies the prediction information to determine intra prediction values.

The encoder (340) represents an inter-picture coded, predicted block of a source picture (331) in terms of prediction from reference pictures. A motion estimator estimates the motion of the block with respect to one or more reference pictures (369). When multiple reference pictures are used, the multiple reference pictures can be from different temporal directions or the same temporal direction. A motion-compensated prediction reference region is a region of sample values in the reference picture(s) that are used to generate motion-compensated prediction values for a block of sample values of a current picture. The motion estimator outputs motion information such as motion vector ("MV") information, which is entropy coded. A motion compensator applies MVs to reference pictures (369) to determine motion-compensated prediction values for inter-picture prediction.

The encoder can determine whether or not to encode and transmit the differences (if any) between a block's prediction values (intra or inter) and corresponding original values. If they are encoded/transmitted, these differences (also called prediction residual values) are further encoded using a frequency transform (if the frequency transform is not skipped), quantization and entropy encoding. For example, the encoder (340) sets values for quantization parameter ("QP") for a picture, tile, slice and/or other portion of video, and quantizes transform coefficients accordingly. The entropy coder of the encoder (340) compresses quantized transform coefficient values as well as certain side information (e.g., MV information, BV information, QP values, mode decisions, parameter choices). Typical entropy coding techniques include Exponential-Golomb coding, Golomb-Rice coding, arithmetic coding, differential coding, Huffman coding, run length coding, variable-length-to-variable-length ("V2V") coding, variable-length-to-fixed-length ("V2F") coding, Lempel-Ziv ("LZ") coding, dictionary coding, probability interval partitioning entropy coding ("PIPE"), and combinations of the above. The entropy coder can use different coding techniques for different kinds of information, can apply multiple techniques in combination (e.g., by applying Golomb-Rice coding followed by arithmetic coding), and can choose from among multiple code tables within a particular coding technique. In some implementations, the frequency transform can be skipped. In this case, prediction residual values can be quantized and entropy coded.

An adaptive deblocking filter is included within the motion compensation loop (that is, "in-loop" filtering) in the encoder (340) to smooth discontinuities across block boundary rows and/or columns in a decoded picture. Other filtering (such as de-ringing filtering, adaptive loop filtering ("ALF"), or sample-adaptive offset ("SAO") filtering; not shown) can alternatively or additionally be applied as in-loop filtering operations.

The encoder (340) produces encoded data in an elementary bitstream. The syntax of the elementary bitstream is typically defined in a codec standard or format, or extension or variation thereof. As the output of the encoder (340), the elementary bitstream is typically packetized or organized in a container format, as explained below.

The encoded data in the elementary bitstream includes syntax elements organized as syntax structures. In general, a syntax element can be any element of data, and a syntax structure is zero or more syntax elements in the elementary bitstream in a specified order. In the H.264/AVC standard and H.265/HEVC standard, a NAL unit is a syntax structure that contains (1) an indication of the type of data to follow and (2) a series of zero or more bytes of the data. For example, a NAL unit can contain encoded data for a slice (coded slice). The size of the NAL unit (in bytes) is indicated outside the NAL unit. Coded slice NAL units and certain other defined types of NAL units are termed video coding layer ("VCL") NAL units. An access unit is a set of one or more NAL units, in consecutive decoding order, containing the encoded data for the slice(s) of a picture, and possibly containing other associated data such as metadata. According to innovations described herein, the elementary bitstream can include a syntax structure that indicates completion of a coded region (e.g., coded slice, coded picture). In some implementations, the syntax structure that indicates completion of a coded region is a special type of NAL unit.

For syntax according to the H.264/AVC standard or H.265/HEVC standard, a picture parameter set ("PPS") is a syntax structure that contains syntax elements that may be associated with a picture. A PPS can be used for a single picture, or a PPS can be reused for multiple pictures in a sequence. A PPS is typically signaled separate from encoded data for a picture (e.g., one NAL unit for a PPS, and one or more other NAL units for encoded data for a picture). Within the encoded data for a picture, a syntax element indicates which PPS to use for the picture. Similarly, for syntax according to the H.264/AVC standard or H.265/HEVC standard, a sequence parameter set ("SPS") is a syntax structure that contains syntax elements that may be associated with a sequence of pictures. A bitstream can include a single SPS or multiple SPSs. An SPS is typically signaled separate from other data for the sequence, and a syntax element in the other data indicates which SPS to use.

With reference to FIG. 3, the coded pictures (341) and MMCO/RPS information (342) (or information equivalent to the MMCO/RPS information (342), since the dependencies and ordering structures for pictures are already known at the encoder (340)) are processed by a decoding process emulator (350). The decoding process emulator (350) implements some of the functionality of a decoder, for example, decoding tasks to reconstruct reference pictures. In a manner consistent with the MMCO/RPS information (342), the decoding processes emulator (350) determines whether a given coded picture (341) needs to be reconstructed and stored for use as a reference picture in inter-picture prediction of subsequent pictures to be encoded. If a coded picture (341) needs to be stored, the decoding process emulator (350) models the decoding process that would be conducted by a decoder that receives the coded picture (341) and produces a corresponding decoded picture (351). In doing so, when the encoder (340) has used decoded picture(s) (369) that have been stored in the decoded picture storage area (360), the decoding process emulator (350) also uses the decoded picture(s) (369) from the storage area (360) as part of the decoding process.

The decoded picture temporary memory storage area (360) includes multiple picture buffer storage areas (361, 362, . . . , 36n). In a manner consistent with the MMCO/RPS information (342), the decoding process emulator (350) manages the contents of the storage area (360) in order to identify any picture buffers (361, 362, etc.) with pictures that are no longer needed by the encoder (340) for use as reference pictures. After modeling the decoding process, the decoding process emulator (350) stores a newly decoded picture (351) in a picture buffer (361, 362, etc.) that has been identified in this manner.

The coded pictures (341) and MMCO/RPS information (342) are buffered in a temporary coded data area (370). The coded data that is aggregated in the coded data area (370) contains, as part of the syntax of the elementary bitstream, encoded data for one or more pictures. The coded data that is aggregated in the coded data area (370) can also include media metadata relating to the coded video data (e.g., as one or more parameters in one or more supplemental enhancement information ("SEI") messages or video usability information ("VUI") messages). The coded data area (370) is an example of a buffer configured to store, as part of an elementary bitstream, syntax structure(s) that contain a coded region for a region, and, after those syntax structure(s), a different syntax structure that indicates the completion of the coded region.

SEI messages are metadata that can a decoder can use for various purposes. In terms of format, an SEI message is a syntax structure that contains (1) an indication of the payload type of payload data to follow, (2) an indication of the size (in bytes) of the payload data to follow, and (3) a series of zero or more bytes of the payload data. The syntax of the payload data depends on the payload type. In some implementations, the syntax structure that indicates completion of a coded region is a special type of SEI message. In the H.265/HEVC standard, an SEI message can be a prefix SEI message or suffix SEI message. A prefix SEI message is an SEI message that precedes at least some coded part of a picture. A suffix SEI message is an SEI message that follows at least some coded part of a picture.

The aggregated data (371) from the temporary coded data area (370) is processed by a channel encoder (380). The channel encoder (380) can packetize and/or multiplex the aggregated data for transmission or storage as a media stream (e.g., according to a media program stream or transport stream format such as ITU-T H.222.01 ISO/IEC 13818-1 or an Internet real-time transport protocol format such as IETF RFC 3550), in which case the channel encoder (380) can add syntax elements as part of the syntax of the media transmission stream. Or, the channel encoder (380) can organize the aggregated data for storage as a file (e.g., according to a media container format such as ISO/IEC 14496-12), in which case the channel encoder (380) can add syntax elements as part of the syntax of the media storage file. Or, more generally, the channel encoder (380) can implement one or more media system multiplexing protocols or transport protocols, in which case the channel encoder (380) can add syntax elements as part of the syntax of the protocol(s). The channel encoder (380) provides output to a channel (390), which represents storage, a communications connection, or another channel for the output. The channel encoder (380) or channel (390) may also include other elements (not shown). e.g., for forward-error correction ("FEC") encoding and analog signal modulation.

IV. Example Decoder Systems.

FIG. 4 is a block diagram of an example decoder system (400) in conjunction with which some described embodiments may be implemented. The decoder system (400) can be a general-purpose decoding tool capable of operating in any of multiple decoding modes such as an ultra-low latency or low-latency decoding mode for real-time communication and a higher-latency decoding mode for media playback from a file or stream, or it can be a special-purpose decoding tool adapted for one such decoding mode. The decoder system (400) can be implemented as part of an operating system module, as part of an application library, as part of a standalone application or using special-purpose hardware. Overall, the decoder system (400) receives coded data from a channel (410) and produces reconstructed pictures as output for an output destination (490). The received encoded data can include syntax structures that indicate completion of coded regions.

The decoder system (400) includes a channel (410), which can represent storage, a communications connection, or another channel for coded data as input. The channel (410) produces coded data that has been channel coded. A channel decoder (420) can process the coded data. For example, the channel decoder (420) de-packetizes and/or demultiplexes data that has been aggregated for transmission or storage as a media stream (e.g., according to a media program stream or transport stream format such as ITU-T H.222.01 ISO/IEC 13818-1 or an internet real-time transport protocol format such as IETF RFC 3550), in which case the channel decoder (420) can parse syntax elements added as part of the syntax of the media transmission stream. Or, the channel decoder (420) separates coded video data that has been aggregated for storage as a file (e.g., according to a media container format such as ISO/IEC 14496-12), in which case the channel decoder (420) can parse syntax elements added as part of the syntax of the media storage file. Or, more generally, the channel decoder (420) can implement one or more media system demultiplexing protocols or transport protocols, in which case the channel decoder (420) can parse syntax elements added as part of the syntax of the protocol(s). The channel (410) or channel decoder (420) may also include other elements (not shown), e.g., for FEC decoding and analog signal demodulation.

The coded data (421) that is output from the channel decoder (420) is stored in a temporary coded data area (430) until a sufficient quantity of such data has been received. The coded data (421) includes coded pictures (431) and MMCO/RPS information (432). The coded data (421) in the coded data area (430) contain, as part of the syntax of an elementary bitstream, coded data for one or more pictures. The coded data (421) in the coded data area (430) can also include media metadata relating to the encoded video data (e.g., as one or more parameters in one or more SEI messages or VUI messages). In some implementations, a syntax structure that indicates completion of a coded region is a special type of SEI message. In other implementations, a syntax structure that indicates completion of a coded region is a special type of NAL unit.

In general, the coded data area (430) temporarily stores coded data (421) until such coded data (421) is used by the decoder (450). The coded data area (430) is an example of a buffer configured to store, as part of an elementary bitstream, syntax structure(s) that contain a coded region for a region, and, after those syntax structure(s), a different syntax structure that indicates the completion of the coded region. As described below, the decoder (450) can use a syntax structure that indicates completion of a coded region (e.g., coded picture, coded slice) to determine when the coded data area (430) has all of the encoded data for the coded region, such that the decoder (450) can begin decoding of the coded region. When a sufficient amount of the encoded data for a coded picture (431) has been received, the coded data for the coded picture (431) and MMCO/RPS information (432) are transferred from the coded data area (430) to the decoder (450). As decoding continues, new coded data is added to the coded data area (430) and the oldest coded data remaining in the coded data area (430) is transferred to the decoder (450).

The decoder (450) decodes a coded picture (431) to produce a corresponding decoded picture (451). A picture can be partitioned into multiple tiles of the same size or different sizes. A picture can also be organized as one or more slices. The content of a slice or tile can be further partitioned into blocks or other sets of sample values.

As appropriate, when performing its decoding process, the decoder (450) may use one or more previously decoded pictures (469) as reference pictures for inter-picture prediction. The decoder (450) reads such previously decoded pictures (469) from a decoded picture temporary memory storage area (460). Generally, the decoder (450) includes multiple decoding modules that perform decoding tasks such as entropy decoding, intra-picture prediction, motion-compensated inter-picture prediction, inverse quantization, inverse frequency transforms (if not skipped), and merging of tiles. The exact operations performed by the decoder (450) can vary depending on compression format.

For example, the decoder (450) receives encoded data for a compressed picture or sequence of pictures and produces output including decoded picture (451). In the decoder (450), a buffer receives encoded data for a coded picture and, at an appropriate time, makes the received encoded data available to an entropy decoder. The entropy decoder entropy decodes entropy-coded quantized data as well as entropy-coded side information, typically applying the inverse of entropy encoding performed in the encoder.

A motion compensator applies motion information to one or more reference pictures to form motion-compensated prediction values for any inter-coded blocks of the picture being reconstructed. An intra-picture prediction module can spatially predict sample values of a current block from neighboring, previously reconstructed sample values. Or, for IBC prediction, the intra-picture prediction module can predict sample values of a current block using previously reconstructed sample values of a reference block in the picture, which is indicated with a displacement value.

The decoder (450) also reconstructs prediction residual values. An inverse quantizer inverse quantizes entropy-decoded data. For example, the decoder (450) sets values for QP for a picture, tile, slice and/or other portion of video based on syntax elements in the bitstream, and inverse quantizes transform coefficients accordingly. An inverse frequency transformer converts the quantized, frequency-domain data into spatial-domain data. In some implementations, the frequency transform can be skipped, in which case the inverse frequency transform is also skipped. If so, prediction residual values can be entropy decoded and inverse quantized. For an inter-picture predicted block, the decoder (450) combines reconstructed prediction residual values with motion-compensated prediction values. The decoder (450) can similarly combine prediction residual values with prediction values from intra-picture prediction.

An adaptive deblocking filter is included within the motion compensation loop in the video decoder (450) to smooth discontinuities across block boundary rows and/or columns in the decoded picture (451). Other filtering (such as de-ringing filtering, ALF, or SAO filtering; not shown) can alternatively or additionally be applied as in-loop filtering operations.

The decoded picture temporary memory storage area (460) includes multiple picture buffer storage areas (461, 462, . . . , 46n). The decoded picture storage area (460) is an example of a decoded picture buffer. The decoder (450) uses the MMCO/RPS information (432) to identify a picture buffer (461, 462, etc.) in which it can store a decoded picture (451). The decoder (450) stores the decoded picture (451) in that picture buffer.

An output sequencer (480) identifies when the next picture to be produced in output order is available in the decoded picture storage area (460). When the next picture (481) to be produced in output order is available in the decoded picture storage area (460), it is read by the output sequencer (480) and output to the output destination (490) (e.g., display). In general, the order in which pictures are output from the decoded picture storage area (460) by the output sequencer (480) may differ from the order in which the pictures are decoded by the decoder (450).

V. Syntax Structures that Indicate Completion of Coded Regions.

This section describes innovations in syntax structures that indicate the completion of coded regions. For example, a syntax structure in an elementary bitstream indicates the completion of a coded region, which is a coded representation of a region. The region can be a slice, tile, picture or other, arbitrary region within a picture. The syntax structure that indicates the completion of a coded region can be a special type of NAL unit, a special type of supplemental enhancement information ("SEI") message or another syntax structure. The innovations can reduce latency during decoding by allowing a decoder to more quickly detect a coded picture boundary and start the decoding process for a given picture. This can be especially helpful for ultra-low-latency scenarios (in which latency is limited to 5-30 milliseconds), but it may also be beneficial for low-latency scenarios (in which longer latencies are tolerated). Also, when decoding of regions can be performed in parallel, the innovations can reduce latency during decoding by allowing a decoder to more quickly detect a coded region boundary and start the decoding process for a given region. The innovations can simplify the decoding process by reducing the amount of data that needs to be buffered before decoding, or by eliminating the need to fully parse incoming data as it arrives. Further, the innovations can facilitate error detection and improve robustness to loss of packets of encoded data (e.g., for a slice or tile).

A. Introduction.

For decoding according to the H.264/AVC standard or H.265/HEVC standard, a decoder may be designed to start the decoding process for a given picture after the decoder has received a coded slice for the given picture, in which case the decoder can start to decode the coded slice. In many implementations, however, a decoder is designed to start the decoding process for a given picture after the decoder has received all of the encoded data for the given picture. The H.264/AVC standard and H.265/HEVC standard define rules for recognizing conditions when all of the encoded data for a given picture has been received. See, e.g., sections 7.4.1.2.3 ("order of NAL units and coded pictures and association to access units") and 7.4.1.2.4 ("detection of the first VCL NAL unit of a primary coded picture") of the H.264/AVC standard; see. e.g., sections 7.4.2.4.4 ("order of NAL units and coded pictures and their association to access units") and 7.4.2.4.5 ("order of VCL NAL units and association to coded pictures") of the H.265/HEVC standard. Detecting the completion of encoded data for a given picture using the rules defined in the H.264/AVC standard or H.265/HEVC standard can introduce significant delay and/or complexity during decoding. In particular, introduction of delay is problematic in real-time video communication scenarios in which having very low latency is critical (such as video conferencing, wireless "screen casting" from a computing device to a nearby display, remote video gaming, etc.). Such scenarios may require ultra-low latency in the range of 5-30 milliseconds.

In one general approach, when a decoder is designed to start the decoding process for a given picture after the decoder has received all of the encoded data for the given picture, to determine that it has received a complete coded picture (that is, to determine it has received all of the encoded data for a given picture in a given access unit), the decoder waits until it receives certain data for the next picture (in decoding order) in the next access unit or receives an indication of the end of a sequence or bitstream. The data for the next picture includes one or more syntax elements that indicate the start of encoded data for the next picture and, by implication, the completion of encoded data for the given picture. This approach often adds up to a one-picture delay during decoding, since the start of decoding of the given picture directly depends on identification of a value in the data for the next picture. In absolute terms, the amount of delay can be significant, especially for ultra-low-latency decoding scenarios or low-latency decoding scenarios. For such decoding scenarios, there may be significant "dead air" gaps (or filler data) between the transmission of different VCL NAL units, or between the transmission of the last VCL NAL unit for a picture and the first VCL NAL unit for the next picture, adding latency for a decoder designed to wait for reception of a complete coded picture.

For example, the decoder can identify a value of a syntax element in a coded slice NAL unit for the next picture (after the given picture in decoding order) in the next access unit, which indicates encoded data for the next picture has started. The syntax element can be a flag in a slice header of a slice of the next picture. In the H.265/HEVC standard, the value of the first_slice_segment_in_pic_flag in a slice segment header indicates whether the slice segment is the first slice segment in a picture. If the value of the first_slice_segment_in_pic_flag is 1, the slice segment is the first slice segment in a picture. Otherwise, the slice segment is not the first slice segment in the picture. Or, for decoding according to the H.264/AVC standard, the syntax element is frame number, PPS identifier, or another syntax element whose value may change if the slice is the first slice in a picture. The start of encoded data for the next picture implies completion of the encoded data for the given picture. In these examples, since a syntax element in a coded slice NAL unit for the next picture is used to detect completion of a given coded picture, up to a one-picture delay is added to decoding.

As another example, the decoder can identify an access unit delimiter ("AUD") NAL unit in the elementary bitstream that indicates the beginning of encoded data for the next picture. When it receives an AUD NAL unit before encoded data for the next picture (after the given picture in decoding order), the decoder can infer that encoded data for the given picture is complete. In the H.264/AVC standard and H.265/HEVC standard. AUD NAL units are optional. When present in the elementary bitstream, however, an AUD NAL unit is supposed to be the first NAL unit of an access unit. Although, in theory, the AUD NAL unit for the next picture could be output immediately following completion of a given coded picture, and before the next picture is even received, in practice this is not an effective strategy for real-time communication or other scenarios requiring ultra-low latency or low latency. In short, rules about assigning a timestamp to an access unit may prevent early signaling of an AUD NAL unit. (For example, suppose a timestamp is associated with the first access unit that starts in a packet, and an access unit starts in a packet when the first byte of data in the access unit is present in that packet. The timestamp, if present, must be in the same packet as the AUD NAL unit, if present, but the timestamp for the next picture may not even be known at the time of completion of the given coded picture. The timestamp is usually provided with an input picture, which might not have been received yet for the next picture. Also, the timestamp is expected to be in the same packet as coded slice data associated with the timestamp, which typically is not ready at the time of completion of the given coded picture. These factors require delay in sending the AUD NAL unit for the next picture.) Thus, awaiting receipt of an AUD NAL unit for the next picture typically adds up to a one-picture delay to decoding of a given picture, and may also require additional buffer space for the coded slice data of the given, current picture. Altering the position of access unit boundaries just to enable early signaling of an AUD NAL unit may be undesirable for other reasons too.

In another approach, when a decoder is designed to start the decoding process for a given picture after the decoder has received all of the encoded data for the given picture, to determine that it has received all of the encoded data for a given picture, the decoder can fully parse the encoded data for the given picture, and determine that the encoded data for the given picture is complete. For example, the decoder fully parses the coded slice NAL units it has received, and determines that the slices complete the given picture. Although this approach potentially avoids some delay during decoding, it can require extra processing and decision-making by the decoder to evaluate whether all of the encoded data for the given picture has been received.

Another approach to determining whether encoded data for a given coded picture is complete uses a syntax element in a container format or side metadata channel, without any dependencies on the data of a next access unit. For example, according to the RTP Payload Format for H.264 Video (IETF RFC 6184), a marker bit can be set to indicate the last packet of an access unit indicated by a timestamp. A decoder may use the marker bit as an early indication of the last packet of an access unit. The marker bit is not part of the syntax of the elementary bitstream, however, so it is not generally available. Also, use of the marker bit may be unreliable.

In another approach, within a media playback tool, a demultiplexer within the media playback tool can create a redundant AUD NAL unit. One AUD NAL unit is used to signal the end of encoded data for a given picture, and another AUD NAL unit is used to signal the start of encoded data for the next picture. The demultiplexer provides the AUD NAL units to a core decoder within the media playback tool. The core decoder can use the first, redundant AUD NAL unit to detect the completion of a coded picture, then use the second AUD NAL unit to detect the start of encoded data for the next picture. This approach is not conformant to the H.264/AVC standard or H.265/HEVC standard, which do not permit multiple AUD NAL units before a single coded picture. Thus, the approach lacks general applicability, and it is inconsistent with many decoder implementations. It may be unclear which of the multiple AUD NAL units has encoded data associated with it. Also, according to this approach, an encoder or other component outside the specific media playback tool cannot insert redundant AUD NAL units to indicate the completion of coded pictures, since that would render the resulting elementary bitstream non-conformant.

B. Examples of Syntax Structures Indicating Completion of Coded Regions.

This section describes examples of syntax structures that indicate completion of coded regions. For example, a syntax structure can be used to indicate the end of a coded picture in an elementary bitstream, allowing a decoder to detect completion of the coded picture without any dependencies on the data of the next access unit. This can simplify and accelerate the process of detecting a complete coded picture, thereby reducing decoding latency in many scenarios. In particular, latency can be reduced in real-time communication and other scenarios requiring ultra-low latency or low latency. Using a syntax structure that indicates the completion of a coded region can also reduce the amount of data that is buffered before decoding and permit detection of completion of a coded picture without fully parsing incoming data as it arrives.

Or, as another example, a syntax structure can be used to indicate the address of the first unit (e.g., block, macroblock, CTB, CTU) of a slice for the next slice header present, if any, in an elementary bitstream. This allows a decoder to detect completion of a coded slice or coded picture (in some cases) without any dependencies on the data of the next access unit. In addition to simplifying and accelerating the process of detecting a complete coded picture, thereby reducing decoding latency, use of the syntax structure can improve performance in a decoding architecture that uses region segmentation. In such a decoding architecture, a decoder can quickly determine how much of a picture has been sent in the preceding VCL NAL units, without waiting for the next slice header. More generally, whereas access unit boundaries have whole-picture granularity, syntax structures that indicate completion of coded slices (or other partial-picture regions) provide a useful mechanism for insertion of finer-grained boundaries in the elementary bitstream.

By marking coded region boundaries in the elementary bitstream, syntax structures that indicate completion of coded regions can facilitate error detection and improve robustness to loss of packets of encoded data. For example, if a decoder receives a syntax structure that indicates completion of a coded picture, but has not received all of the encoded data for the picture, the decoder can detect the loss of encoded data for part of the picture (for a slice, for a tile, etc.). Also, if encoded data is corrupted, the decoder may be able to use a syntax structure that indicates completion of a coded region to identify a point at which it can reliably restart parsing encoded data from the bitstream.

Even when it includes a syntax structure that indicates the completion of a coded region, an elementary bitstream is conformant to a codec format (e.g., codec standard, proprietary format) in some example implementations. The elementary bitstream can be decoded by a conformant decoder, even if the decoder does not recognize the syntax structure that indicates the completion of the coded region. Thus, in these example implementations, an elementary bitstream that includes a syntax structure indicating the completion of a coded region is compatible with decoders that recognize the syntax structure and compatible with decoders that do not recognize the syntax structure. Also, an encoder or other media processing tool can insert syntax structures that indicate the completion of coded regions.

Depending on implementation, the syntax structures can be special types of NAL units, special types of SEI messages, or other syntax structures. A syntax structure that indicates the completion of a coded region can be part of the same access unit that contains the coded region, which can simplify processing. The syntax structures that indicate completion of coded regions can be used in variations or extensions of the H.264/AVC standard, H.265/HEVC standard, or another codec standard or format. In a given standard or format, the syntax structure that indicates the completion of a coded region is typically different than a syntax structure (e.g., AUD NAL unit) that indicates the start of encoded data for a picture. Also, unlike approaches that use multiple AUD NAL units between pictures, using a syntax structure that indicates the completion of a coded region avoids ambiguity about which NAL units are associated with a given access unit.

Figure 5A:
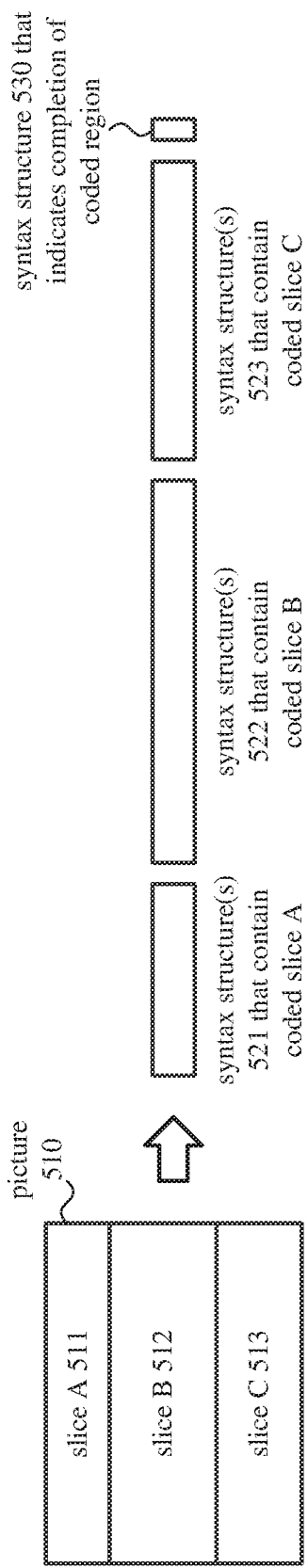
FIGS. 5a and 5b are diagrams of uses of syntax structures that indicate completion of coded regions.
Figure 5B:
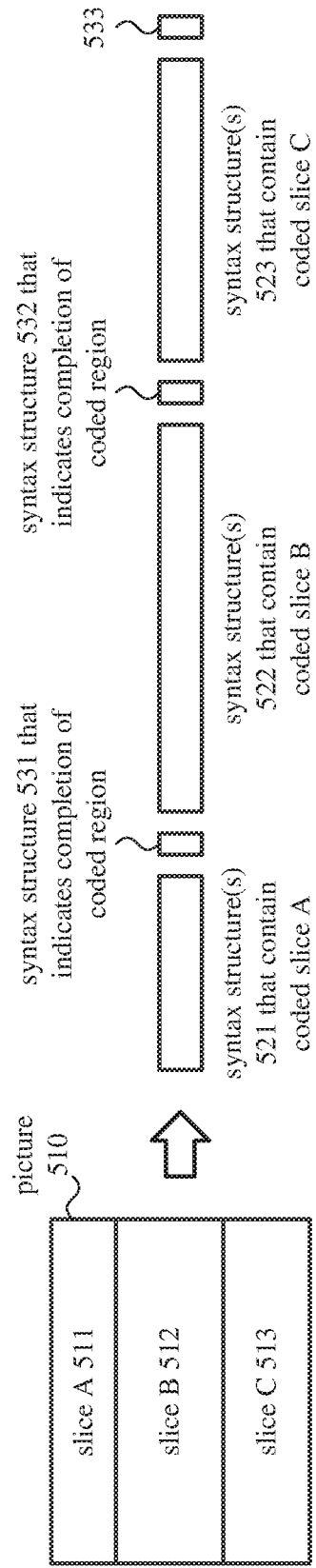

FIGS. 5*a* and 5*b* show examples (501, 502) of uses of syntax structures that indicate completion of coded regions.

In FIG. 5a and FIG. 5b, a picture (510) includes three slices—slice A (511), slice B (512) and slice C (513). The picture includes no tiles. Alternatively, the picture (510) can have some other configuration of slices and/or tiles.

An encoder encodes the slices (511, 512, 513) of the picture (510), producing coded data for the slices. Specifically, the encoder produces one or more syntax structures (521) that contain coded slice A, one or more syntax structures (522) that contain coded slice B, and one or more syntax structures (523) that contain coded slice C. The syntax structures are, for example, coded slice NAL units according to the H.264/AVC standard or H.265/HEVC standard. Alternatively, the syntax structures for coded slice data are another type of syntax structure.

In FIG. 5a, a syntax structure (530) indicates completion of a coded region. In particular, the syntax structure (530) follows the syntax structure(s) (523) that contain coded slice C. For example, the syntax structure (530) can be a special type of NAL unit that indicates the end of encoded data for the picture (510) (that is, completion of the coded picture). Or, the syntax structure (530) can be a special type of SEI message that indicates the end of encoded data for slice C (513) (that is, completion of coded slice C), which is also the end of encoded data for the picture (510).

In FIG. 5b, three syntax structures (531, 532, 533) indicate completion of coded regions. In particular, the syntax structure (531) follows the syntax structure(s) (521) that contain coded slice A, the syntax structure (532) follows the syntax structure(s) (522) that contain coded slice B, and the syntax structure (533) follows the syntax structure(s) (523) that contain coded slice C. For example, each of the syntax structures (531, 532, 533) can be a special type of SEI message that indicates completion of the coded slice (521, 522, 523) that precedes it.

In FIG. 5a, the syntax structure (530) can indicate the completion of a coded region that is a coded picture. In FIG. 5b, the syntax structures (531, 532, 533) indicate completion of coded regions that are coded slices, and the third syntax structure (533) also indicates completion of the coded picture. More generally, a syntax structure that indicates the completion of a coded region can indicate the end of encoded data for an arbitrary region in a given picture. The arbitrary region can correspond to a slice, a picture or some amount of blocks or other units within a picture. For example, the syntax structure includes a syntax element that specifies the address of a next unit (e.g., block, macroblock, CTB, CTU) (in a defined scan order) with encoded data in the bitstream. By implication, encoded data has been received for all units before the next unit (in the defined scan order) in the given picture. If the address of the next unit is zero, the end of encoded data for the given picture is indicated (that is, the next unit, if any, with encoded data in the bitstream is unit zero of the next picture). The defined scan order can be a raster scan pattern across the given picture, a tile-prioritized raster scan pattern (e.g., units from left-to-right within a tile, repeating from top-to-bottom within that tile until the tile is completed, and then continuing with the next tile to the right, if any, or the next row of tiles, if any, in the given picture, as rows of tiles are scanned from top to bottom of the given picture), or some other scan order defined at the encoder and decoder. Insertion of a syntax structure that indicates the completion of a coded, arbitrary region can also indicate the correctness of entropy decoding processes (e.g., for context-adaptive binary arithmetic coding/decoding) when decoding of the coded region starts. That is, a syntax structure that indicates the completion of a coded region should not be inserted if decoding of the coded region cannot begin as soon as the syntax structure is received by a decoder (e.g., due to entropy decoding dependencies that might not be satisfied).

FIG. 6 shows the syntax of a portion (600) of an example end-of-picture NAL unit that indicates the completion of a coded region. Specifically, FIG. 6 shows a raw byte sequence payload ("RBSP") for the end-of-picture NAL unit. Overall, the end-of-picture NAL unit can be organized as defined in sections 7.3.1.1 and 7.3.1.2 of the H.265/HEVC standard (for H.265 NAL units, generally), organized as defined in section 7.3.1 of the H.264/AVC standard (for H.264 NAL units, generally), or organized in some other way.

A syntax element in the end-of-picture NAL unit (e.g., nal_unit_type) designates the NAL unit as an end-of-region indicator. For example, for H.264/AVC implementations, the nal_unit_type has a value of 22, which is currently a reserved value in the H.264/AVC standard. As another example, for H.265/HEVC implementations, the nal_unit_type has a value of 45, which is currently a reserved value in the H.265/HEVC standard. Alternatively, the nal_unit_type has another value, or a NAL unit type extension mechanism is used. In general, the H.264/AVC standard or H.265/HEVC standard can be extended to assign a previously reserved value of nal_unit_type to a new type of NAL unit, such that the resulting elementary bitstream is conformant with the H.264/AVC standard or H.265/HEVC standard. If a decoder does not recognize the new type of NAL unit, the decoder can simply ignore the new type of NAL unit.

In FIG. 6, the RBSP portion (600) of the end-of-picture NAL unit includes no syntax elements. Alternatively, the RBSP portion (0.600) can include one or more syntax elements that specify, for example, an address of a next unit to be decoded, in which case the end-of-picture NAL unit can be used more generally as an end-of-region indicator.

In some example implementations, there are constraints on placement of an end-of-picture NAL unit in an elementary bitstream. For example, for H.264/AVC implementations, when an end-of-picture NAL unit is present, the end-of-picture NAL unit has to be the first NAL unit that follows a primary coded picture, all redundant coded pictures (if any), all coded slices of an auxiliary coded picture without partitioning NAL units (if any), and all filler data NAL units (if any). Or, for H.265/HEVC implementations, when an end-of-picture NAL unit is present, the end-of-picture NAL unit has to follow the last VCL NAL unit of the access unit, and follow a NAL unit (if any) with nal_unit_type that is equal to FD_NUT (filler data NAL unit type) or SUFFIX_SEI_NUT, or that is in the range of RSV_NVCL46 . . . RSV_NVCL47 or UNSPEC56 . . . UNSPEC63. Alternatively, other and/or additional constraints are applied with respect to placement of an end-of-picture NAL unit in an elementary bitstream.

FIG. 7 shows the syntax of a portion (700) of an example end-of-region SEI message that indicates the completion of a coded region. Specifically. FIG. 7 shows a payload for the end-of-region SEI message. The end-of-region SEI message can be organized as defined in section 7.3.2.3.1 of the H.265/HEVC standard (for H.265 NAL units) or organized in some other way.

One or more syntax elements in the end-of-region SEI message designate the SEI message as an end-of-region indicator. For example, for H.265/HEVC implementations, the SEI message has a payload type value that is assigned to the end-of-region SEI message. In general, the H.265/HEVC standard can be extended to assign a previously unassigned value of payload type to a new type of SEI message, such that the resulting elementary bitstream is conformant with the H.265/HEVC standard. If a decoder does not recognize the new type of SEI message, the decoder can simply ignore the new type of SEI message.

In FIG. 7, the payload portion (700) of the end-of-region SEI message includes a single syntax element. The syntax element next_segment_address indicates the value of the syntax element slice_segment_address in the next slice header, when present, in the elementary bitstream. In the H.265/HEVC standard, the slice_segment_address syntax element specifies the address of the first CTB in a slice segment, in a CTB raster scan order for a picture. The slice_segment_address syntax element in the next slice header is not present in the elementary bitstream, however, for the first slice segment of a picture (that is, when first_slice_in_pic_flag is equal to 1) or if no next slice header is present in the bitstream. In the example of FIG. 5b, for example, if the syntax structure (531) is an end-of-region SEI message whose payload is organized as in FIG. 7, the syntax element next_segment_address in the SEI message has a value equal to the slice_segment_address in the slice header for slice B.

When the next slice is the first slice of the next picture (e.g., in H.265/HEVC implementations, when the next slice header has first_slice_in_pic_flag equal to 1) or no next slice header is present in the bitstream, the value of next_segment_address is equal to 0. In the example of FIG. 5b, for example, if the syntax structure (533) is an end-of-region SEI message whose payload is organized as in FIG. 7, the syntax element next_segment_address in the SEI message has a value of zero.

Or, if a codec standard or format uses slices but not slice segments, the SEI message can include a syntax element that indicates the slice address of the next slice with encoded data in the bitstream. The slice address can be, for example, the address of a block, macroblock, CTB, CTU, or other unit that begins the next slice, or the slice address can be some other identifier of the next slice or its starting point. If the slice address of the next slice is zero, the end of encoded data for the given picture is indicated (that is, the next unit, if any, with encoded data in the bitstream is unit zero of the next picture).

Or, more generally, the SEI message can include a syntax element that indicates the address of a next unit (e.g., block, macroblock, CTB, CTU) of a region (e.g., slice, tile, picture) with encoded data in the bitstream. If the address of the next unit is zero, the end of encoded data for the given picture is indicated (that is, the next unit, if any, with encoded data in the bitstream is unit zero of the next picture). Alternatively, the payload portion (700) can include no syntax elements (e.g., if the SEI message indicates the completion of a coded picture), or the payload portion (700) can include other and/or additional syntax elements.

In FIG. 7, the syntax element next_segment_address is represented using unsigned Exponential-Golomb coding (shown as ue(v)). This approach reduces the number of bits used to represent the value zero, which is expected to be the most common value for the syntax element next_segment_address (indicating that the next slice, if any, starts a new coded picture). For example, a single-bit value of 1 represents the value zero for next_segment_address. In contrast, according to the H.265/HEVC standard, the syntax element slice_segment_address is represented using a fixed-length representation of an unsigned integer, where other syntax elements (for the width and height of a picture) indicate the length of the fixed-length representation. The syntax element next_segment_address in an end-of-region SEI message can also be represented using a fixed-length representation of an unsigned integer, but this may create a dependency on another syntax element that indicates the number of bits in the fixed-length representation of the unsigned integer. Alternatively, the syntax element next_segment_address is represented in some other way.

There may be constraints on placement of an end-of-region SEI message in an elementary bitstream. In some example implementations, for example, the SEI message that indicates completion of a coded region is a suffix SEI message. If the end-of-region SEI message is a suffix SEI message, it can be placed in the same access unit as the coded region whose completion it indicates. Multiple end-of-region suffix SEI messages can be positioned in a given access unit. Alternatively, an end-of-region SEI message can be a prefix SEI message. If the end-of-region SEI message is a prefix SEI message, it can be placed in the next access unit after the coded region whose completion it indicates. Alternatively, other and/or additional constraints are applied with respect to placement of an end-of-region SEI message in an elementary bitstream.

If dependent slice segments are enabled, the presence of an end-of-region SEI message can be prohibited if the next slice segment is a dependent slice segment. Alternatively, when the next slice segment is a dependent slice segment, the end-of-region SEI message can indicate the position of the first CTU of the dependent slice segment (e.g., with the next_segment_address syntax element of the end-of-region SEI message indicating the value of the slice_segment_address syntax element in the slice header for the next, dependent slice segment).

The H.264/AVC standard does not currently support suffix SEI messages. According to the H.264/AVC standard, an SEI message precedes a coded picture, at the beginning of an access unit. To use end-of-region SEI messages as shown in FIG. 7, the H.264/AVC standard can be extended to support suffix SEI messages. Two coding tools—arbitrary slice order and flexible macroblock order—add other complications, at least for some profiles of the H.264/AVC standard. With these two coding tools, units of slices need not use a simple, defined scan order, which can complicate the signaling of completion of coded regions.

C. Example Uses of Syntax Structures Indicating Completion of Coded Regions.

FIG. 8 shows a generalized technique (800) for inserting a syntax structure that indicates completion of a coded region. A media processing tool such as a video encoder (e.g., encoder (340) shown in FIG. 3 or other encoder), multiplexer (e.g., channel encoder (380) shown in FIG. 3 or other multiplexer), or bitstream editor can perform the technique (800). FIG. 9 shows a generalized technique (900) for using a syntax structure that indicates completion of a coded region. A media processing tool such as a video decoder (e.g., decoder (450) shown in FIG. 4 or other decoder), demultiplexer (e.g., channel decoder (420) shown in FIG. 4 or other demultiplexer), or bitstream editor can perform the technique (900).

With reference to FIG. 8, a media processing tool (such as an encoder, multiplexer or bitstream editor) detects (810) completion of a coded region for a region of an image or video. The coded region is a coded representation of the region, which can be a slice, tile, picture or other, arbitrary region within a picture.

The media processing tool outputs (820), in an elementary bitstream, one or more syntax structures that contain the coded region, and, after the syntax structure(s) that contain the coded region, a different syntax structure that indicates the completion of the coded region. For example, the different syntax structure indicates the completion of a coded slice, coded tile, or coded picture. Or, the different syntax structure indicates the completion of encoded data for some other, arbitrary region within the picture. Typically, the elementary bitstream is conformant to a codec format.

A single access unit in the elementary bitstream can contain the syntax structure(s) that contain the coded region and the different syntax structure that indicates the completion of the coded region. Even when it includes the different syntax structure that indicates the completion of the coded region, the elementary bitstream is conformant to a codec format (e.g., codec standard, proprietary format). The single access unit can contain syntax structures that contain multiple coded regions (e.g., multiple coded slices of a given picture) as well as multiple different syntax structures that indicate the completion of the coded regions, respectively.

If the media processing tool is an encoder, the media processing tool can also encode the region to produce the coded region. In this case, the encoding can include the detection (810) of the completion of the coded region and, based on the detection (810), addition of the different syntax structure to the elementary bitstream.

With reference to FIG. 9, a media processing tool (such as a decoder, demultiplexer or bitstream editor) receives (910), in an elementary bitstream, one or more syntax structures that contain a coded region, and, after the syntax structure(s) that contain the coded region, a different syntax structure that indicates completion of the coded region. For example, the different syntax structure indicates the completion of a coded slice, coded tile, or coded picture. Or, the different syntax structure indicates the completion of encoded data for some other, arbitrary region within the picture. Typically, the elementary bitstream is conformant to a codec format.

A single access unit in the elementary bitstream can contain the syntax structure(s) that contain the coded region and the different syntax structure that indicates the completion of the coded region. Even when it includes the different syntax structure, the elementary bitstream is conformant to a codec format (e.g., codec standard, proprietary format). The single access unit can contain syntax structures that contain multiple coded regions (e.g., multiple coded slices of a given picture) as well as multiple different syntax structures that indicate the completion of the coded regions, respectively.

The media processing tool detects (920) the completion of the coded region using the different syntax structure. The coded region is a coded representation of a region of an image or video, which can be a slice, tile, picture or other, arbitrary region within a picture. If the media processing tool is a decoder, the media processing tool can also decode the coded region to reconstruct the region. The decoder of the media processing tool can be implemented entirely in software. Or, at least some operations of the decoder can be performed using special-purpose hardware (e.g., offloading certain decoding operations to a GPU or other acceleration hardware, or using a special-purpose hardware decoder for decoding operations).

With reference to FIGS. 8 and 9, the syntax structure(s) that contain the coded region can be coded slice NAL unit(s) according to the H.265/HEVC standard or H.264/AVC standard. Or, the syntax structure(s) that contain the coded region can be some other type of syntax structure that includes encoded data for the coded region.

With reference to FIGS. 8 and 9, the different syntax structure can be a NAL unit having a NAL unit type, where the NAL unit type designates the NAL unit as an end-of-region indicator (e.g., as described with reference to FIG. 6). Or, the different syntax structure can be an SEI message having a payload type, where the payload type designates the SEI message as an end-of-region indicator (e.g., as described with reference to FIG. 7). The SEI message can be a suffix SEI message or prefix SEI message. Or, the different syntax structure can be another type of syntax structure. One or more constraints may control placement in the elementary bitstream of the syntax structure that indicates the completion of the coded region. Examples of constraints are described with reference to FIGS. 8 and 9. Alternatively, other and/or additional constraints are applied with respect to placement in the elementary bitstream of the syntax structure that indicates the completion of the coded region. In any case, the syntax structure(s) that contain the coded region and the syntax structure that indicates the completion of the coded region are typically in a predefined order, which facilitates detection of the completion of the coded region. For example, the syntax structure(s) that contain the coded region and the syntax structure that indicates the completion of the coded region follow a specific order of NAL units for an access unit. Or, the syntax structure(s) that contain the coded region and the syntax structure that indicates the completion of the coded region are ordered in some other way defined according to a codec format.

With reference to FIGS. 8 and 9, the syntax structure that indicates the completion of the coded region can be empty (include no syntax elements). For example, the syntax structure indicates completion of encoded data for a picture. Or, the syntax structure that indicates the completion of the coded region can include one or more syntax elements. For example, the syntax structure includes an address of a first unit of a slice for a next slice header (e.g., a slice segment address for a next slice segment header). If the address is zero, the syntax structure indicates (as the completion of the coded region) completion of encoded data for a final slice of a picture. Otherwise, if the address is greater than zero, the syntax structure indicates (as the completion of the coded region) completion of encoded data for a non-final slice of the picture. Alternatively, the syntax structure that indicates the completion of the coded region includes other and/or additional syntax elements.

Alternatively, a media processing tool (such as a decoder) receives, in an elementary bitstream, syntax structure(s) that contain a coded region, and, after the syntax structure(s) that contain the coded region, a different syntax structure that indicates completion of the coded region. The media processing tool can process the different syntax structure (e.g., using the different syntax structure to detect the completion of the coded region) or ignore the different syntax structure (e.g., discarding the different syntax structure). The media processing tool decodes the coded region to reconstruct the region. The decoding can be performed entirely in software. Or, at least some operations of the decoding can be performed using special-purpose hardware (e.g., offloading certain decoding operations to a GPU or other acceleration hardware, or using a special-purpose hardware decoder for decoding operations). The different syntax structure can be a NAL unit, SEI message or other type of syntax structure, as described above, and can be empty or include one or more syntax elements, as described above.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. One or more computer-readable media having stored thereon computer-executable instructions for causing a processor, when programmed thereby, to perform operations comprising:

receiving, in an elementary bitstream, one or more syntax structures that contain a coded region for a region of an image or video, and, after the one or more syntax structures that contain the coded region, a different syntax structure, the different syntax structure including a next slice segment address that indicates a slice segment address for a next slice segment header when the slice segment address for the next slice segment header is present in the elementary bitstream, wherein the next slice segment address is zero if the next slice segment header is for a first slice segment of a next picture or if no next slice segment header is present in the elementary bitstream; and detecting the completion of the coded region using the different syntax structure.

2. The one or more computer-readable media of claim 1, wherein the different syntax structure is a supplemental enhancement information ("SEI") message having a payload type that designates the SEI message as an end-of-region indicator.

3. The one or more computer-readable media of claim 1, wherein the operations further comprise:

determining that the next slice segment address is zero; and based on the next slice segment address, determining that the completion of the coded region is completion of encoded data for a final slice segment of a current picture.

4. The one or more computer-readable media of claim 1, wherein the operations further comprise:

determining that the next slice segment address is greater than zero; and based on the next slice segment address, determining that the completion of the coded region is completion of encoded data for a non-final slice segment of a current picture.

5. The one or more computer-readable media of claim 1, wherein the operations further comprise:

decoding the coded region to reconstruct the region as part of an ultra-low-latency or low-latency decoding mode for real-time communication.

6. The one or more computer-readable media of claim 1, wherein the operations further comprise:

decoding the coded region to reconstruct the region in parallel with decoding of one or more other coded regions.

7. The one or more computer-readable media of claim 1, wherein the operations further comprise:

using the different data structure as part of detection of loss of encoded data in the elementary bitstream.

8. In a computing system, a method comprising:

detecting completion of a coded region for a region of an image or video; and outputting, in an elementary bitstream, one or more syntax structures that contain the coded region, and, after the one or more syntax structures that contain the coded region, a different syntax structure that indicates the completion of the coded region, the different syntax structure including a next slice segment address that indicates a slice segment address for a next slice segment header when the slice segment address for the next slice segment header is present in the elementary bitstream, wherein the next slice segment address is zero if the next slice segment header is for a first slice segment of a next picture or if no next slice segment header is present in the elementary bitstream.

9. The method of claim 8, further comprising:

encoding the region to produce the coded region, wherein the encoding includes the detecting the completion of the coded region and, based on the detecting, adding the different syntax structure to the elementary bitstream.

10. The method of claim 8, wherein the different syntax structure is a supplemental enhancement information ("SEI") message having a payload type that designates the SEI message as an end-of-region indicator.

11. The method of claim 8, further comprising:

determining that the completion of the coded region is completion of encoded data for a final slice segment of a current picture; and setting the next slice segment address to be zero.

12. The method of claim 8, further comprising:

determining that the completion of the coded region is completion of encoded data for a non-final slice segment of a current picture; and setting the next slice segment address to be the slice segment address for the next slice segment header, wherein the slice segment address for the next slice segment header is greater than zero.

13. The method of claim 8, wherein a single access unit in the elementary bitstream contains the one or more syntax structures that contain the coded region and the different syntax structure that indicates the completion of the coded region.

14. A computer system comprising one or more processors, memory, and storage, the memory and/or storage having stored therein computer-executable instructions for causing the computer system, when programmed thereby, to perform operations comprising:

detecting completion of a coded region for a region of an image or video; and outputting, in an elementary bitstream, one or more syntax structures that contain the coded region, and, after the one or more syntax structures that contain the coded region, a different syntax structure that indicates the completion of the coded region, the different syntax structure including a next slice segment address that indicates a slice segment address for a next slice segment header when the slice segment address for the next slice segment header is present in the elementary bitstream, wherein the next slice segment address is zero if the next slice segment header is for a first slice segment of a next picture or if no next slice segment header is present in the elementary bitstream.

15. The computer system of claim 14, wherein the operations further comprise:

encoding the region to produce the coded region, wherein the encoding includes the detecting the completion of the coded region and, based on the detecting, adding the different syntax structure to the elementary bitstream.

16. The computer system of claim 14, wherein the operations further comprise:
  determining that the completion of the coded region is completion of encoded data for a final slice segment of a current picture; and
  setting the next slice segment address to be zero.

17. The computer system of claim 14, wherein the operations further comprise:
  determining that the completion of the coded region is completion of encoded data for a non-final slice segment of a current picture; and
  setting the next slice segment address to be the slice segment address for the next slice segment header, wherein the slice segment address for the next slice segment header is greater than zero.

18. The computer system of claim 14, wherein the different syntax structure is a supplemental enhancement information ("SEI") message having a payload type that designates the SEI message as an end-of-region indicator.

19. The computer system of claim 14, wherein a single access unit in the elementary bitstream contains the one or more syntax structures that contain the coded region and the different syntax structure that indicates the completion of the coded region.

20. The computer system of claim 14, wherein the operations further comprise:
  as part of an ultra-low-latency or low-latency encoding mode for real-time communication, encoding the region to produce the coded region.

\* \* \* \* \*